United States Patent
Mehrotra et al.

(10) Patent No.: US 11,477,275 B1
(45) Date of Patent: Oct. 18, 2022

(54) TECHNIQUES FOR DEPLOYING WORKLOADS ON NODES IN A CLOUD-COMPUTING ENVIRONMENT

(71) Applicant: Microsoft Technology Licensing, LLC, Redmond, WA (US)

(72) Inventors: Sanjeev Mehrotra, Kirkland, WA (US); Paramvir Bahl, Bellevue, WA (US); Anuj Kalia, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/316,314

(22) Filed: May 10, 2021

(51) Int. Cl.
*G06F 15/173* (2006.01)
*H04L 67/1008* (2022.01)

(52) U.S. Cl.
CPC ................ *H04L 67/1008* (2013.01)

(58) Field of Classification Search
CPC .......... H04L 41/147; H04L 41/0823; H04L 41/0803
USPC ................................ 709/224, 226
See application file for complete search history.

(56) References Cited

U.S. PATENT DOCUMENTS

| 2014/0095693 A1* | 4/2014 | Apte ................ H04L 67/22 709/224 |
| 2015/0012634 A1* | 1/2015 | Zhu ................ G06F 9/5072 709/223 |

\* cited by examiner

*Primary Examiner* — Wing F Chan
*Assistant Examiner* — Andrew Woo
(74) *Attorney, Agent, or Firm* — ArentFox Schiff LLP

(57) ABSTRACT

Described are examples for deploying workloads in a cloud-computing environment. In an aspect, based on a desired number of workloads of a process to be executed in a cloud-computing environment and based on one or more failure probabilities, an actual number of workloads of the process to execute in the cloud-computing environment to provide a level of service can be determined and deployed. In another aspect, a standby workload can be executed as a second instance of the process without at least a portion of the separate configuration used by the multiple workloads, and based on detecting termination of one of multiple workloads, the standby workload can be configured to execute based on the separate configuration of the separate instance of the process corresponding to the one of the multiple workloads.

19 Claims, 6 Drawing Sheets

TECHNIQUES FOR DEPLOYING WORKLOADS ON NODES IN A CLOUD-COMPUTING ENVIRONMENT

BACKGROUND

Cloud-computing environments are provided for distributed storage and access of software (e.g., services or other applications), files, data, etc. across multiple devices connected via a network, such as the Internet. Using distributed nodes to store data and/or allow execution of the software can improve reliability of the software and data through redundancy, improved on-demand access of the software and data from various other nodes in the network, more efficient execution of software or retrieval of data by using certain nodes or services in the network, and/or the like. A cloud-computing environment can include one or more compute clusters that provide one or more functions. The compute clusters can include a workload that executes on one or more nodes to provide redundant functionality, and a load balancer or router that can balance requests across workloads or route requests based on a characteristic (e.g., an identifier in the request that is associated with one of the workloads). In one specific example, cloud-computing environments can be used to provide mobile edge computing (MEC) where certain functions of a mobile network can be provided as workloads on nodes in the cloud-computing environment.

In MEC, a centralized unit (CU) can be implemented in a back-end node, one or more distributed units (DUs) can be implemented in intermediate nodes, and various remote units (RU), which can provide at least physical (PHY) and/or media access control (MAC) layers of a base station or other radio access network (RAN) node of the mobile network, can be deployed at edge serves. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc. In addition, the CU, DUs, RUs, or portions thereof, may each execute as a workload on nodes of the cloud-computing environment and/or in a given compute cluster thereof.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for deploying workloads on nodes in a cloud-computing environment is provided. The method includes determining, for a process to be provided in the cloud-computing environment, a desired number of workloads of the process to be executed in the cloud-computing environment, determining, based on the desired number of workloads and based on one or more failure probabilities, an actual number of workloads of the process to execute in the cloud-computing environment to provide a level of service, wherein the actual number of workloads includes the desired number of workloads and one or more additional workloads, and deploying, based on determining the actual number of workloads, one or more workloads to one or more nodes of the cloud-computing environment to reach the actual number of workloads of the process executing in the cloud-computing environment.

In another example, a computer-implemented method for handling failure for workloads in a cloud-computing environment is provided. The method includes executing multiple workloads in a cloud-computing environment cluster, wherein each workload of the multiple workloads corresponds to a separate instance of a process that is executed according to a separate configuration, executing a standby workload as a second instance of the process without at least a portion of the separate configuration used by the multiple workloads, and based on detecting termination of one of the multiple workloads, configuring the standby workload to execute based on the separate configuration of the separate instance of the process corresponding to the one of the multiple workloads.

In another example, a device for deploying workloads on nodes in a cloud-computing environment is provided that includes a memory storing one or more parameters or instructions for deploying workloads in the cloud-computing environment, and at least one processor coupled to the memory. The at least one processor is configured to determine, for a process to be provided in the cloud-computing environment, a desired number of workloads of the process to be executed in the cloud-computing environment, determine, based on the desired number of workloads and based on one or more failure probabilities, an actual number of workloads of the process to execute in the cloud-computing environment to provide a level of service, wherein the actual number of workloads includes the desired number of workloads and one or more additional workloads, and deploy, based on determining the actual number of workloads, one or more workloads to one or more nodes of the cloud-computing environment to reach the actual number of workloads of the process executing in the cloud-computing environment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
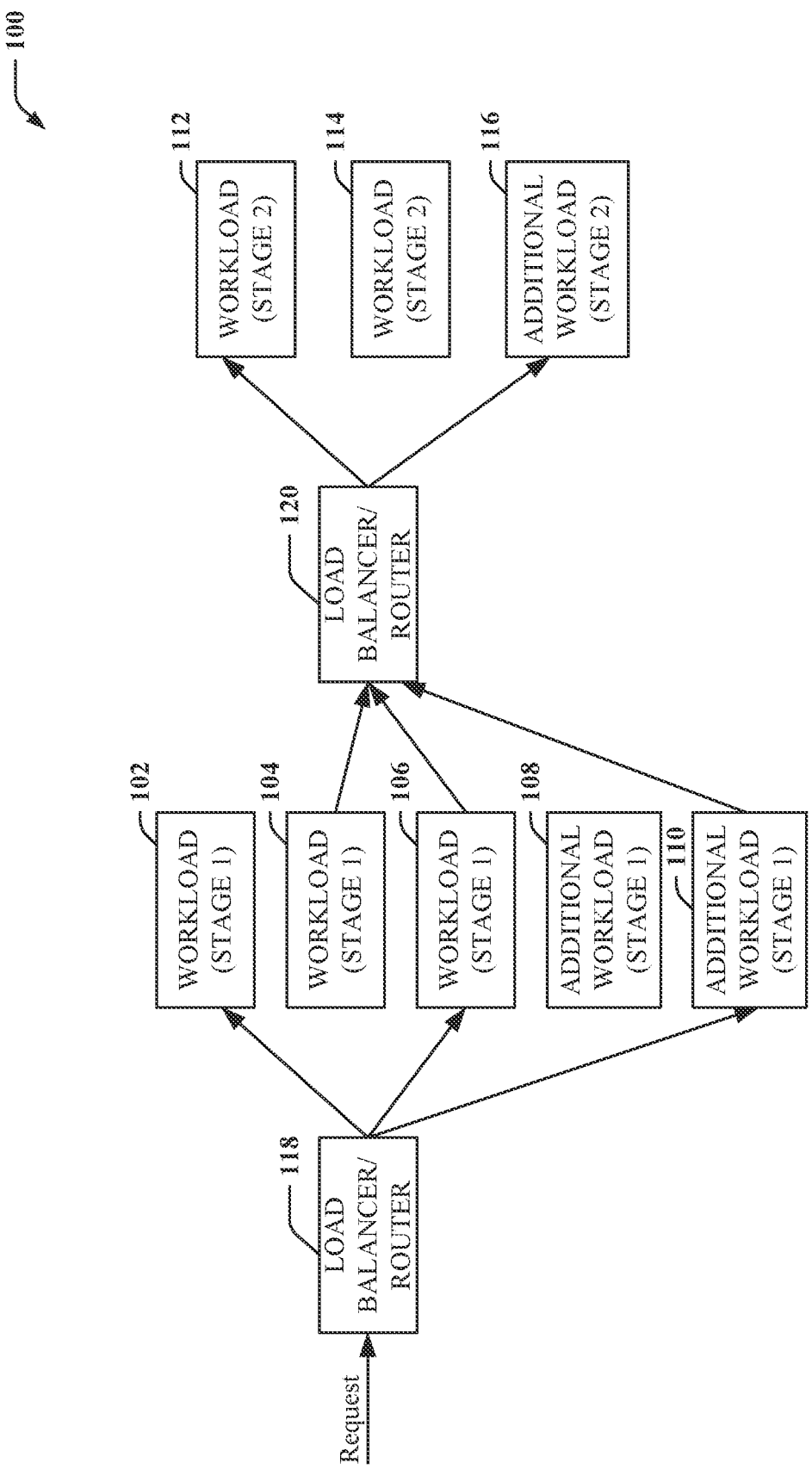
FIG. 1 is a diagram of an example of a cloud-computing environment cluster for executing multiple workloads, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to deploying workloads over nodes in a cloud-computing environment. In some aspects, given a number of workloads of a process to be deployed, one or more additional workloads can be deployed to provide redundancy to improve failure or fault scenarios where one or more of the original workloads, or a respective node on which the one or more workloads are executing, fail. A node, as described herein, can include a physical machine (e.g., a physical device, such as a server or other computer), a virtual machine (e.g., where a physical machine can execute one or more virtual machines and/or where a virtual machine can execute over one or more physical machines), or any machine or location at which a workload can execute. In one aspect, the workloads may execute a same or similar process according to a different configuration. In this aspect, for example, an additional workload may be a standby workload that is a fully functioning instance of the process that does not execute, or does not execute according to a specific configuration, until it is configured based on a specific configuration. In this aspect, when a workload executing based on a given configuration fails, the standby workload can be configured based on the configuration, and executed to provide the function of the workload based on the given configuration to provide a redundant process. In this regard, the standby workload can be used to recover any workload based on the failing workload's given configuration. In this aspect, it may not be required to have a redundant node for each specifically configured workload, but rather one or more standby nodes are provided that can be configured using any of the given configurations of the other workloads.

In another aspect, the number of additional workloads to deploy can be determined based on a desired number of workloads for the process and one or more failure probabilities. For example, the one or more failure probabilities can correspond to failure probability of the process, failure probability of a node on which the workload is executing, etc. The one or more failure probabilities can be determined or specified for a given timeslot. In an example, the one or more failure probabilities can be determined based on a history of failures for the process, the one or more nodes, etc. In any case, given a desired number of workloads and the one or more failure probabilities, an actual number of workloads to deploy can be determined. In this aspect, one or more additional workloads can be deployed based on determining the actual number (e.g., one or more additional workloads over the desired number of workloads) to achieve a level of service. Other considerations can be used in determining the actual number of workloads as well (e.g., and/or in determining the one or more failure probabilities), such as a location of the nodes on which the workloads are deployed (or are to be deployed), a node type desired for the workload, a cost of deploying at one or more nodes, etc.

Figure 2:
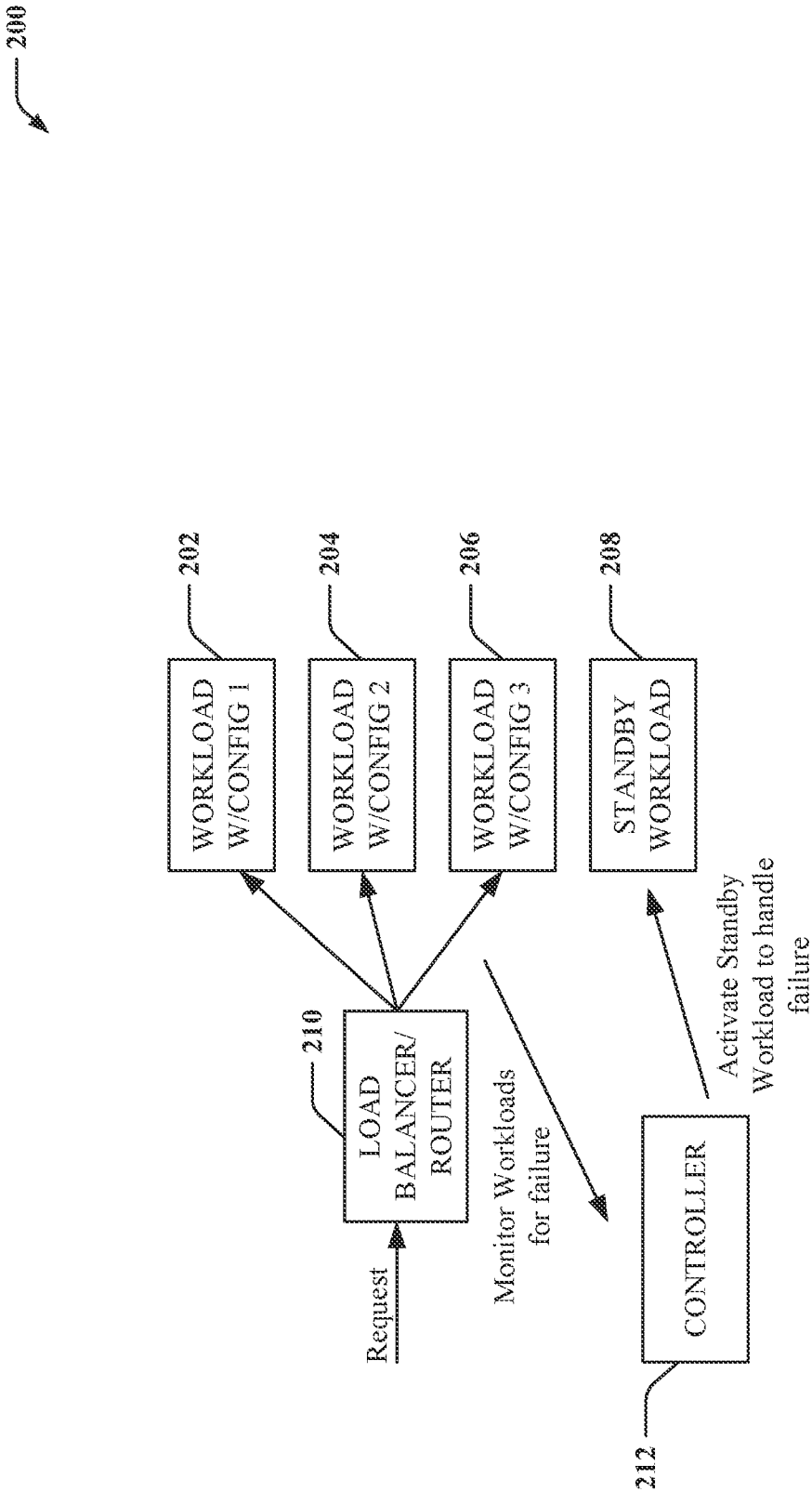
FIG. 2 is a diagram of an example of a cloud-computing environment cluster for executing multiple separately configured workloads, in accordance with aspects described herein.
Figure 3:
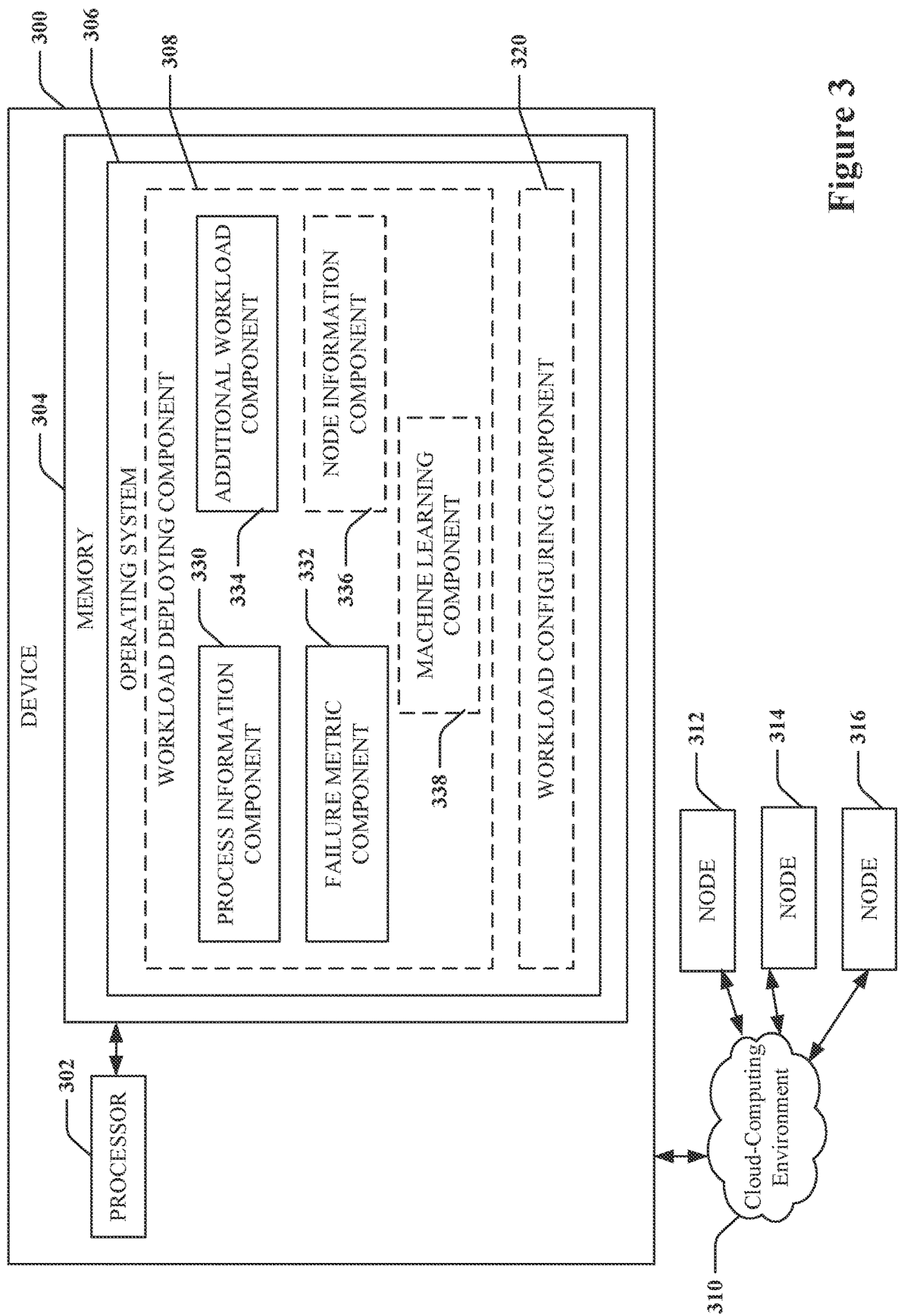
FIG. 3 is a schematic diagram of an example of a device for deploying and/or configuring workloads, in accordance with aspects described herein.
Figure 4:
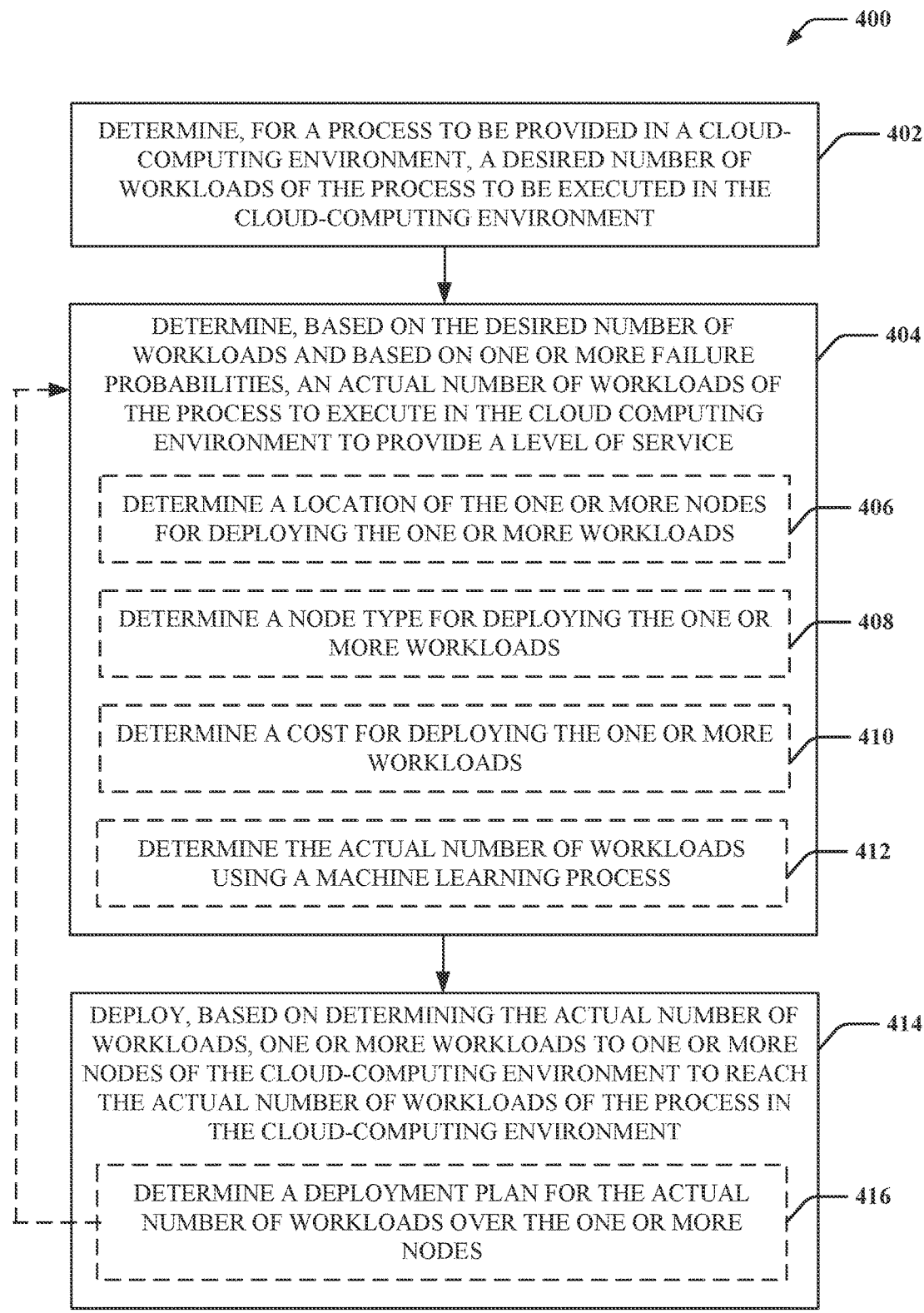
FIG. 4 is a flow diagram of an example of a method for deploying workloads, in accordance with aspects described herein.
Figure 5:
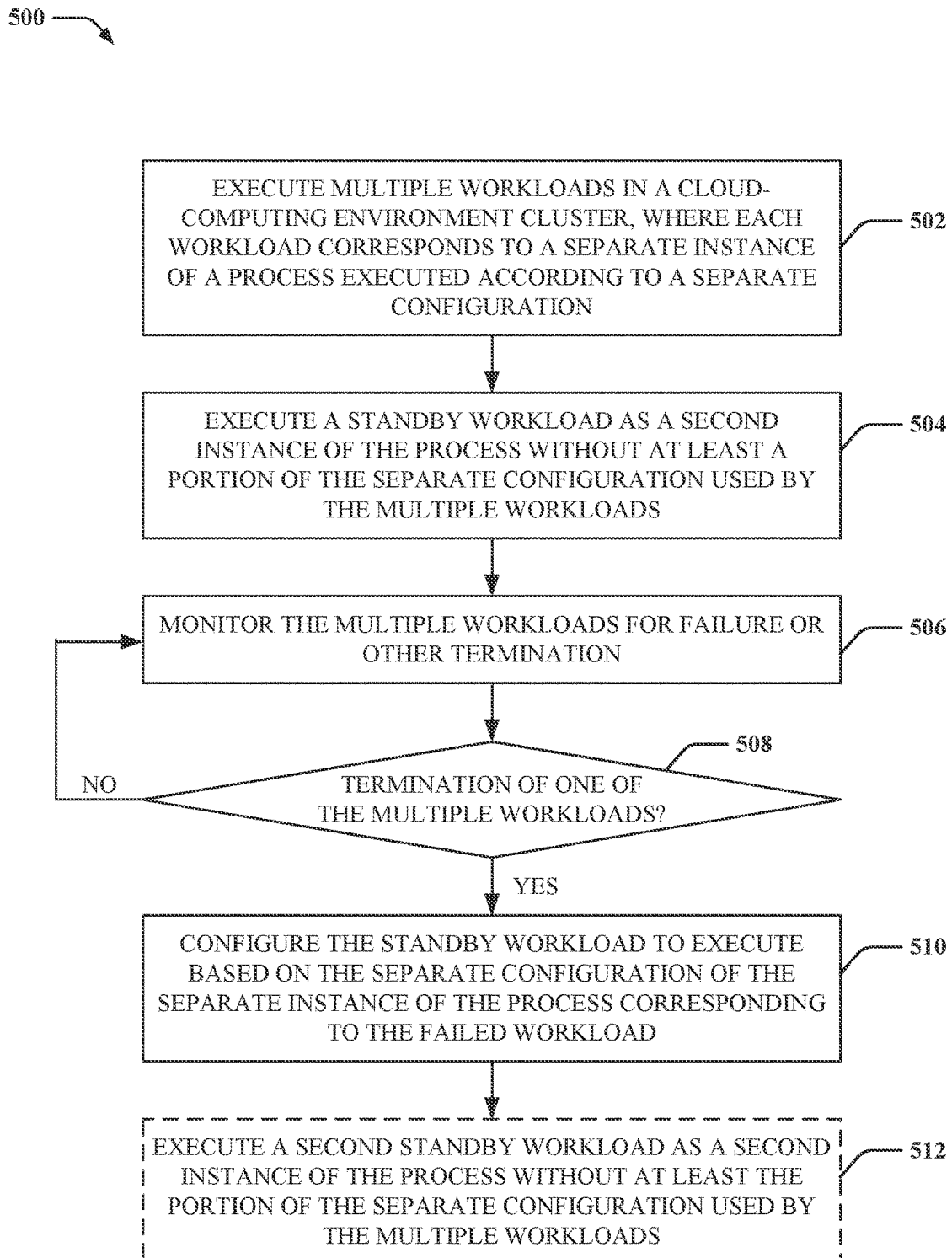
FIG. 5 is a flow diagram of an example of a method for configuring standby workloads, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIGS. 4-5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a diagram of an example of a compute cluster 100 in a cloud-computing environment. Compute cluster 100 can include multiple workloads 102, 104, 106, 108, 110, 112, 114, 116 that can be similarly configured to execute at least a portion of a process or service. For example, workloads 102, 104, 106, 108, 110 can be configured to execute stage 1 of a multi-stage process, and may be configured, using the same configuration, to perform the same process stage to provide redundancy for the process stage 1. Similarly, workloads 112, 114, 116 can be configured to execute stage 2 of the multi-stage process, and may be configured, using the same configuration, to perform the same process stage to provide redundancy for the process stage 2. Load balancers/routers 118, 120 can be provided to receive requests or commands for processing via the corresponding process stage, and can select a workload to handle the request based on various considerations, such as processing load on each of the workloads or other routing considerations (e.g., distance to a location of a node on which the workload is operating, node type or hardware that may relate to the request to be fulfilled, etc.), a cost of deploying the workload at one or more nodes (e.g., and whether this cost complies with the SLA or other agreement for deploying the workload), etc.

In an example, the workloads 102, 104, 106, 108, 110, 112, 114, 116 can be executed on various nodes of a cloud-computing environment, as described further herein. For example, workloads 102, 104, 106 may represent a desired number of workloads for process (or process stage 1). An actual number of workloads can be determined based on one or more failure probabilities, as described further herein, to provide a desired level of service. The actual number of workloads can be greater than the desired number of workloads, and as such, additional workloads 108, 110 can be added, activated, etc. to provide at least the level of service (e.g., at least the number of desired workloads executing at a given point in time or time duration) in view of failure probabilities for the process (or process stage), corresponding nodes on which the process is executing, etc. Similarly, for example, workloads 112, 114 may represent a desired number of workloads for process (or process stage 2). The actual number of workloads can be determined based on one or more failure probabilities, as described further herein, to provide a desired level of service for the process stage 2. The actual number of workloads can be greater than the desired number of workloads, and as such, additional workload 116 can be added, activated, etc. to provide at least the level of service in view of failure probabilities for the process stage 2, corresponding nodes on which the process stage 2 is executing, etc.

The compute cluster 100 can be part of the cloud-computing environment and can include machines (e.g., physical or virtual) with memory, processor(s), devices, etc., and the machines can be managed by an orchestration environment. In this regard, for example, the orchestration environment can manage execution of, access to, etc. various nodes in the cloud-computing environment. In an example, the load balancers/routers 118, 120 can use abstractions of the orchestration environment to route requests to the corresponding workloads 102, 104, 106, 108, 110, 112, 114, 116. In the specific example of compute cluster 100, any workload can handle any request for the processor stage, and load balancers/routers 118, 120 can accordingly route a request to any of the corresponding workloads 102, 104, 106, 108, 110, 112, 114, 116.

FIG. 2 is a diagram of an example of a compute cluster 200 in a cloud-computing environment including separately configured workloads. Compute cluster 200 can include multiple workloads 202, 204, 206 that can be configured to execute at least a portion of a similar process or service using a different configuration. For example, workload 202 can be configured to execute the process using configuration 1, workload 204 can be configured to execute the process using configuration 2, workload 206 can be configured to execute the process using configuration 3, etc. For example, the configurations can differ by one or more parameters or corresponding values, such as an environment variable. In one specific example, the workloads 202, 204, 206 can execute a base station process, or at least a portion of a RAN function of a base station process, and each workload 202, 204, 206 can be configured as a different base station (e.g., where each workload 202, 204, 206 has a different base station identifier).

Compute cluster 200 can also include a standby workload 208 that may not be configured based on a specific configuration. Standby workload 208, for example, may operate in a suspended state or be deactivated until activated to replace a failed or otherwise terminated workload. For example, a controller 212 can monitor the workloads 202, 204, 206 to detect a failure or other termination (e.g., termination of the corresponding node as a failure, a planned termination for servicing the node, etc.). In any case, based on detecting the failure or termination of the workload, controller 212 can activate standby workload 208 with the configuration of the failed workload. For example, where controller 212 detects failure of workload 206, controller 212 can activate the standby workload with configuration 3 to replace workload 206. In this regard, a separate redundant workload may not be needed for each separately configured workload in order to provide redundancy for the similar (e.g., same) process being executed by the workloads 202, 204, 206.

As similarly described with respect to compute cluster 100, for example, load balancer/router 210 can be provided to receive requests or commands for processing via the corresponding process, and can select a workload to handle the request based on the configuration of the given workload. In addition, for example, each configuration may have multiple workloads, and load balancer/router 210 can select among multiple workloads having the desired configuration based on various other considerations, as described above, such as processing load on each of the workloads or other routing considerations (e.g., distance to a location of a node on which the workload is operating, node type or hardware that may relate to the request to be fulfilled, etc.). Moreover, in an example, workloads 202, 204, 206 (and/or 208 if configured and activated) can be one stage of a multi-stage process and can pass output to another stage of the multi-stage process, which may also be specific to the corresponding configuration. In a specific example, the workloads 202, 204, 206 can operate a RAN function, such as in a fifth generation (5G) network, which may be part of a mobile edge computing (MEC) configuration. In this example, each workload 202, 204, 206 can operate a function or node of a 5G RAN, such as a RU to provide at least PHY layer of the RAN. In an example, the workloads 202, 204, 206 can each be coupled to another workload (e.g., a MAC layer for the RU) for the specific RU or other base station or portion thereof.

In an example, the workloads 202, 204, 206, 208 can be executed on various nodes of a cloud-computing environment, as described further herein. For example, workloads 202, 204, 206, may represent a desired number of workloads for process (or process stage 1). An actual number of workloads can be determined based on one or more failure probabilities, as described further herein, to provide a desired level of service. The actual number of workloads can be greater than the desired number of workloads, and as such, additional standby workload 208 can be added, activated, etc. to provide at least the level of service (e.g., at least the number of desired workloads executing at a given point in time or time duration) in view of failure probabilities for the process (or process stage), corresponding nodes on which the process is executing, etc.

The compute cluster 200 can be part of the cloud-computing environment and can include machines (e.g., physical or virtual) with memory, processor(s), devices, etc., and the machines can be managed by an orchestration environment. In this regard, for example, the orchestration environment can manage execution of, access to, etc. various nodes in the cloud-computing environment. In an example, the load balancer/router 210 can use abstractions of the orchestration environment to route requests to the corresponding workloads 202, 204, 206, 208.

FIG. 3 is a schematic diagram of an example of a device 300 (e.g., a computing device) for performing functions related to deploying or managing workloads over nodes of a cloud-computing environment. In an example, device 300 can include a processor 302 and/or memory 304 configured to execute or store instructions or other parameters related to providing an operating system 306, which can execute one or more applications or processes, such as, but not limited to, at least one of a workload deploying component 308 for deploying workloads over nodes of a cloud-computing environment 310 (e.g., nodes 312, 314, 316) or a workload configuring component 320 for configuring or activating a standby workload to provide a workload function of a configured workload that failed or was otherwise terminated, as described further herein. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, workload deploying component 308 can include one or more of a process information component 330 for obtaining information related to a process to be deployed in multiple workloads in a cloud-computing environment 310, a failure metric component 332 for measuring or otherwise determining one or more failure metrics related to the multiple workloads or corresponding nodes over which the workloads are, or are to be, deployed, an additional workload component 334 for determining additional workloads to deploy to achieve a level of service for the process, a node information component 336 for obtaining other information related to nodes over which the workloads are, or are to be, deployed, which can be used in determining the additional workloads, and/or a machine learning component 338 for using machine learning to determine the additional workloads. Thus, in one example, additional workload component 334 can determine one or more additional workloads over a desired number of workloads for the process to ensure the level of service given determined failure probabilities, node types, cost, machine learning, etc., as described further herein. Additional workload component 334 can determine how many and/or where to deploy the additional workloads (e.g., which nodes) in the cloud-computing environment 310.

FIG. 4 is a flowchart of an example of a method 400 for deploying workloads for a process over nodes in a cloud-computing environment. For example, method 400 can be performed by a device 300 and/or one or more components thereof to facilitate workload deployment or management in a cloud-computing environment.

In method 400, at action 402, a desired number of workloads of a process to be executed in a cloud-computing environment can be determined for a process to be provided in the cloud-computing environment. In an example, process information component 330 of a workload deploying component 308, e.g., in conjunction with processor 302, memory 304, operating system 306, etc., can determine, for a process to be provided in a cloud-computing environment (e.g., cloud-computing environment 310), the desired number of workloads of the process to be executed in the cloud-computing environment. For example, the process information can indicate the number of workloads to be executed for the process, where the more workloads can provide redundancy for the process. The process information can be indicated in a configuration, which can be obtained by the process information component 330 as part of workload deploying component 308 determining or effectuating a deployment plan for the process. In addition, for example, the process can be associated with a service level agreement (SLA), which may be indicated in the process information. For example, the SLA may have or be associated with a level of service or reliability (e.g., workloads available x % of the time). In this regard, as described herein, workload deploying component 308 may determine to activate additional workloads over the desired number of workloads in an attempt to ensure the SLA is met or achieved.

In an example, the SLA (or level of reliability), the desired number of workloads for the process, etc. can be input into a configuration, into an orchestration environment that can manage deployment of the workloads, etc. In this example, process information component 330 can obtain the SLA, desired number of workloads, or related information or parameters from the configuration, the orchestration environment, etc.

In method 400, at action 404, an actual number of workloads of the process to execute in the cloud-computing environment to provide a level of service can be determined based on the desired number of workloads and based on one or more failure probabilities. In an example, additional workload component 334 of a workload deploying component 308, e.g., in conjunction with processor 302, memory 304, operating system 306, etc., can determine, based on the desired number of workloads and based on the one or more failure probabilities, the actual number of workloads of the process to execute in the cloud-computing environment to provide the level of service. For example, failure metric component 332 can determine one or more failure metrics related to the desired number of workloads, which can include determining a failure probability that the workload fails or otherwise terminates at a time instance or during a time duration, a failure probability that a node on which the workload is executing fails or otherwise terminates at a time instance or during a time duration, etc. In any case, additional workload component 334 can determine a number of additional workloads to add in the cloud computing environment 310 so that the desired number of workloads are executing at the time instance or during the time duration even if one or more workloads or corresponding nodes fail or otherwise terminate.

In one specific example, additional workload component 334 can determine the total actual number of workloads or at least the number of additional workloads using a formula similar to the following and finding the smallest value K that satisfies the formula:

$$\sum_{i=n}^{N+K} \binom{N+K}{i}(1-p-n)^i(p+n)^{N+K-i} \leq \alpha$$

where N is the desired number of workloads, K is the number of additional workloads, p is the probability of workload failure or termination for a given timeslot, n is the probability of node failure or termination for the given timeslot, and α is a SLA (e.g., a reliability probability) for the service. In an example, one or more of the probabilities, p or n, can be determined based on received or observed historical state information for the workload or node (e.g., an amount of time or number of time slots within a period of time or time slots during which the workload or node is terminated). In another example, one or more of the probabilities, p or n, can be determined from, or received in, a configuration related to the workload or node. In yet another example, as described further herein, one or more of the probabilities, p or n, can be determined by machine learning where one or more other input parameters related to a workload or node can be modeled with an output of failure probability or time periods/time slots during which a workload is likely to be in a terminated or failed state. In one example, the above formula can be used for certain values of p and n where adding the probabilities can reflect a total probability of failure for the workload at the node and/or where other assumptions made regarding workload failure and node failure may be independent.

In an example, in determining the actual number of workloads at action 404, optionally at action 406, a location of the one or more nodes for deploying the one or more workloads can be determined. In an example, node information component 336 of a workload deploying component 308, e.g., in conjunction with processor 302, memory 304, operating system 306, etc., can determine the location of the one or more nodes for deploying the one or more workloads, which can include determining location of one or more nodes to which the one or more workloads are, or are to be, deployed. For example, the location of the one or more nodes can include a physical location of the node in the world (e.g., global positioning system (GPS) coordinates of the node). In one example, the location of the one or more nodes may be used to determine a failure probability for the one or more nodes. For example, nodes located in a first location having more frequency earthquakes or other natural disaster than a second location may have a higher failure probability than nodes located in the second location. In an example, additional workload component 334 can accordingly use different failure probabilities based on location in computing the number of additional workloads.

In another example, in determining the actual number of workloads at action 404, optionally at action 408, a node type for deploying the one or more workloads can be determined. In an example, node information component 336 of a workload deploying component 308, e.g., in conjunction with processor 302, memory 304, operating system 306, etc., can determine the node type for deploying the one or more workloads. For example, nodes of a first type (e.g., nodes having certain hardware, such as more complex hardware) may have a higher failure rate and/or higher downtime caused by failure than nodes of a second type. In an example, additional workload component 334 can accordingly use different failure probabilities based on node type in computing the number of additional workloads.

In another example, in determining the actual number of workloads at action 404, optionally at action 410, a cost for deploying the one or more workloads can be determined. In an example, node information component 336 of a workload deploying component 308, e.g., in conjunction with processor 302, memory 304, operating system 306, etc., can determine the cost for deploying the one or more workloads. For example, the cost can be associated with a monetary equipment cost or latency cost, etc. associated with one or more of the nodes. In this example, additional workload component 334 can determine whether using the one or more nodes complies with the cost requirements for deploying the workload in the cloud computing environment 310, where the cost may be part of or specified in the SLA or other agreement. In another example, additional workload component 334 can select the one or more nodes such to comply with the cost requirements. In other examples, as described above and further herein, additional workload component 334 can select the one or more nodes that maximize other properties, such as distance between locations of the nodes, with the cost requirements.

In yet another example, in determining the actual number of workloads at action 404, optionally at action 412, the actual number of workloads can be determined using a machine learning process. In an example, machine learning component 338 of a workload deploying component 308, e.g., in conjunction with processor 302, memory 304, operating system 306, etc., can determine the actual number of workloads using the machine learning process. For example, machine learning component 338 can use a model trained using data from deployed workloads that can provide a failure probability for the workload or node based on various inputs.

In an example, machine learning component 338 can accept inputs including one or more workload related parameters (e.g., type of the workload, such as a RAN workload, a specific RAN type of workload, such as RU, DU, CU, etc., size of the workload, an expected or historical utilization metric of the workload, an expected or historical processor or memory usage metric of the workload, etc.). In another example, machine learning component 338 can accept inputs including one or more node related parameters (e.g., location of the node, a node type, an expected or historical utilization metric of the node, an expected or historical processor or memory usage metric of the node, etc.). Based on the inputs, machine learning component 338 can train a model, or access a model trained on such inputs, to provide an output of failure probability that the workload or node will be in a terminated or failed state in a given time or time slot, as described.

In method 400, at action 414, one or more workloads can be deployed, based on determining the actual number of workloads, to one or more nodes of the cloud-computing environment to reach the actual number of workloads of the process in the cloud-computing environment. In an example, workload deploying component 308, e.g., in conjunction with processor 302, memory 304, operating system 306, etc., can deploy, based on determining the actual number of workloads, the one or more workloads to one or more nodes of the cloud-computing environment to reach the actual number of workloads of the process in the cloud-computing environment. In an example, workload deploying component 308 can deploy the desired number of workloads, and then can determine and deploy the additional workloads. In another example, workload deploying component 308 can generate a deployment plan based on the number of desired workloads, can determine the additional number of workloads, and can deploy all workloads based on the deployment plan. As described, workload deploying component 308 can be, or can be part of, an orchestration environment that can manage and access various distributed nodes to deploy workloads, forward requests to the workloads, handle responses from the workloads, etc. In addition, the one or more workloads may include actual workloads, configured workloads, standby workloads, etc., as described above and further herein.

In deploying the one or more workloads at action 414, optionally at action 416, a deployment plan for the actual number of workloads over the one or more nodes can be determined. In an example, workload deploying component 308, e.g., in conjunction with processor 302, memory 304, operating system 306, etc., can determine the deployment plan for the actual number of workloads over the one or more nodes. For example, based on the actual number of workloads, workload deploying component 308 can determine or select nodes of the cloud-computing environment 310 (e.g., nodes 312, 314, 316, etc.) over which to deploy the additional workloads (and/or the desired number of workloads). In an example, workload deploying component 308 can determine or select the nodes based on properties of the nodes, as described, such as location, node type, etc. For example, some workloads may require or benefit from certain node types (e.g., nodes having certain types of hardware), which workload deploying component 308 can consider in developing a deployment plan or otherwise deploying the workloads. In another example, workload deploying component 308 can consider location of the node(s) in developing the deployment plan such to avoid deploying workloads on the same node where possible, to balance benefits of maximally distributing nodes with latency caused by distance between nodes, etc.

In an example, workload deploying component 308 can develop the deployment plan and can then determine additional workloads based on the plan at action 404. In another example, workload deploying component 308 can use similar considerations described for determining the actual number of workloads in determining the deployment plan. For example, workload deploying component 308 can determine the deployment plan based on the location of nodes, node type, cost of deployment, using machine learning, etc. In an example, workload deploying component 308 can test hypotheses of where to deploy workloads (e.g., on which nodes) based on the functions described in action 404, such to determine node locations for the workloads (e.g., that may result in the lowest number, or acceptable number, of additional workloads). In this example, workload deploying component 308 can select nodes for deploying each of the actual number of workloads, and the selection may be based on determining a location of the nodes, node type of the nodes, etc. to balance distribution of the nodes with latency, to ensure desired node types are used, etc. Workload deploying component 308 can then determine, based on the selected nodes, whether additional workloads are needed to meet the SLA (e.g., to satisfy the equation shown above based on failure probability of the selected nodes (and/or of the workload)). If so, workload deploying component 308 can either determine nodes over which to deploy additional workloads or can modify the deployment plan (e.g., modify the nodes over which the workloads are to be deployed) in an attempt to reduce the number of additional workloads needed to achieve the SLA.

In some examples, workload and node failures may be correlated and measured to determine true probability of failure at any given time. Measurement may include duration of each failure—for example, some failures can be longer, leading to consideration of time slot in determining failure probability, as described. A goal of deployment can be to distribute workloads across nodes as much as possible, while also considering latency related to distance between nodes (which can impact the service level), corresponding changes in failure probability, etc.

FIG. 5 is a flowchart of an example of a method 500 for configuring standby workloads in a cloud-computing environment. For example, method 500 can be performed by a device 300 and/or one or more components thereof to facilitate deploying, configuring, activating, or otherwise managing standby workloads.

In method 500, at action 502, multiple workloads can be executed in a cloud-computing environment cluster, where each workload corresponds to a separate instance of a process executed according to a separate configuration. In an example, workload deploying component 308, e.g., in conjunction with processor 302, memory 304, operating system 306, etc., can execute, or manage deployment or execution of, the multiple workloads in the cloud-computing environment 310 cluster (e.g., over one or more nodes 312, 314, 316 of the cloud-computing environment 310), where each workload corresponds to a separate instance of a process executed according to a separate configuration. For example, workload configuring component 320 can configure the multiple workloads each with a separate configuration, and workload deploying component 308 can deploy the multiple workloads, as described above.

In a specific example, the workloads can each correspond to a different instance of a RAN component, as described, such as a different base station. In this example, the configurations may each specify a different base station or cell identifier, which can allow for routing of requests to an appropriate workload based on the base station or cell identifier.

Moreover, for example, where the workloads operate based on a separate configuration, workload deploying component 308 can determine additional workloads, as desired to reach a SLA, as standby workloads, which workload deploying component 308 may additionally deploy one or more nodes in the cloud-computing environment 310. As described above with respect to FIG. 2, workload deploying component 308 can deploy workload 202 with a first configuration, workload 204 with a second configuration, workload 206 with a third configuration, and/or standby workload 208, each on a node of the cloud-computing environment, based on a deployment plan, etc.

In method 500, at action 504, a standby workload can be executed as a second instance of the process without at least a portion of the separate configuration used by the multiple workloads. In an example, workload deploying component 308, e.g., in conjunction with processor 302, memory 304, operating system 306, etc., can execute the standby workload as the second instance of the process without, or otherwise agnostic to, at least the portion of the separate configuration used by the multiple workloads. For example, the standby workload, as described, can be a functional instance of the workload that may not be initially executing, or may not have a configuration for executing or activating the workload, and as such the standby workload can be configured to execute as one of multiple deployed nodes to provide redundancy thereof. In an example, the standby workload can be executing such that a load balancer/router 210 does not forward requests to the standby workload until the standby workload is configured (e.g., by a controller 212).

In method 500, at action 506, the multiple workloads can be monitored for failure or other termination. In an example, workload deploying component 308, e.g., in conjunction with processor 302, memory 304, operating system 306, etc., can monitor the multiple workloads for failure or other termination (e.g., termination of the node or of processes executing via the node for maintenance, etc.). As described, for example, workload deploying component 308 can be, or can be part of, an orchestration environment for managing workloads, and as such can receive, or monitor for, information of the workloads or related nodes, such as node failure or termination of the workload.

In method 500, at action 508, it can be determined whether (or detected that) one of the multiple workloads is terminated. In an example, workload deploying component 308, e.g., in conjunction with processor 302, memory 304, operating system 306, etc., can determine termination of one of the multiple workloads. In this example, where the workload has terminated, at action 510, the standby workload can be configured to execute based on the separate configuration of the separate instance of the process corresponding to the failed workload. In an example, workload configuring component 320, e.g., in conjunction with processor 302, memory 304, operating system 306, etc., can configure the standby workload to execute based on the separate configuration of the separate instance of the process corresponding to the failed workload. For example, workload configuring component 320 can determine the configuration of the terminated workload and can use the configuration in configuring the standby workload to execute as the terminated workload to provide redundancy therefor. In an example, the configuration can include one or more environment variables, such as a base station or cell identifier, and workload configuring component 320 can configure the standby workload to function as the terminated workload based on the base station or cell identifier. For example, workload configuring component 320 can provide the function of the controller 212 described herein.

In addition, for example, based on termination of the one of the multiple workloads (and/or based on configuring the standby workload), optionally at action 512, a second standby workload can be executed as a second instance of the process without at least the portion of the separate configuration used by the multiple workloads. In an example, workload deploying component 308, e.g., in conjunction with processor 302, memory 304, operating system 306, etc., can execute the second standby workload as the second instance of the process without at least the portion of the separate configuration used by the multiple workloads. For example, workload deploying component 308 can determine to add the second standby workload as an additional workload using the functions described above with reference to FIG. 3. In another example, workload deploying component 308 can determine to add the second standby workload as the terminated workload, such that the standby workload configured at action 510 can continue operating as the configured workload even when the terminated workload is reinitialized or reestablished, and the reinitialized terminated workload can be reinitiated as the standby workload. In yet another example, workload deploying component 308 can reinitialize or reestablish the terminated workload as originally configured once available, and can reconfiguration the standby workload that was configured at action 510 to return as the standby workload with no specific configuration.

Figure 6:
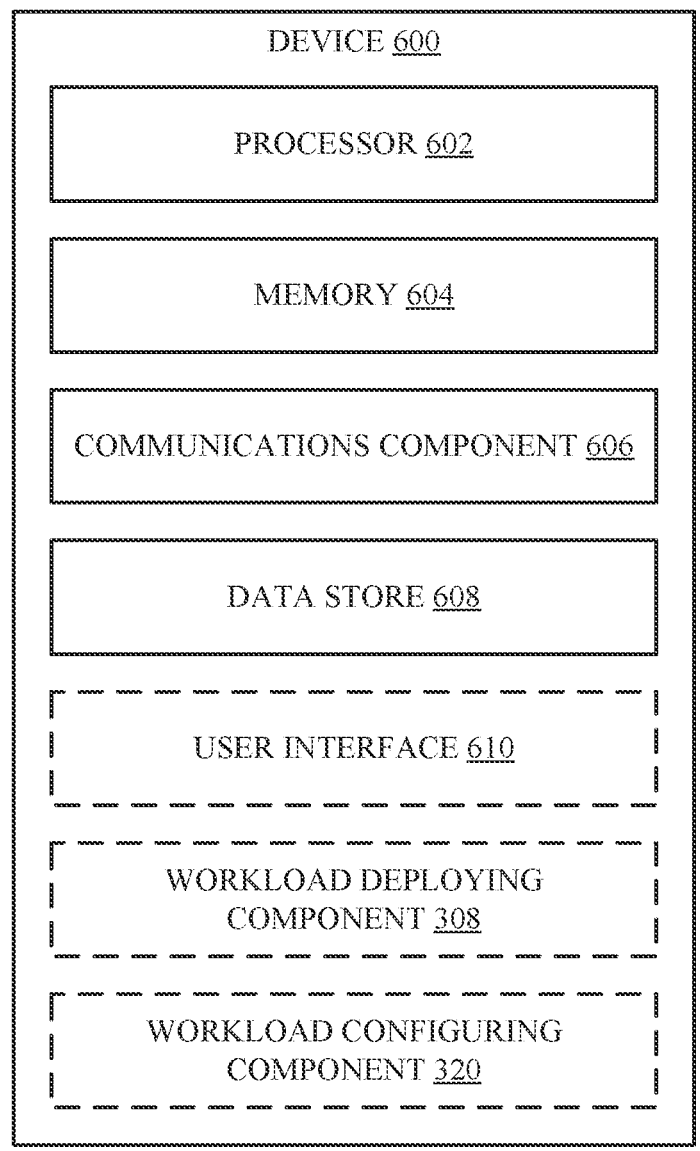
FIG. 6 is a schematic diagram of an example of a device for performing functions described herein, in accordance with aspects described herein.

FIG. 6 illustrates an example of device 600 including additional optional component details as those shown in FIG. 3. In one aspect, device 600 may include processor 602, which may be similar to processor 302 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 304 such as for storing local versions of operating systems (or components thereof) and/or applications being executed by processor 602, such as a workload deploying component 308, workload configuring component 320, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for workload deploying component 308, workload configuring component 320, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a workload deploying component 308 for deploying workloads of a process in a cloud-computing environment, a workload configuring component 320 for configuring different workloads as different instances of the process according to separate configurations, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for deploying workloads on nodes in a cloud-computing environment, comprising:
   determining, for a process to be provided in the cloud-computing environment, a desired number of workloads of the process to be executed in the cloud-computing environment, wherein each workload in the desired number of workloads is of a different configuration of the process;
   determining, based on the desired number of workloads and based on one or more failure probabilities, an actual number of workloads of the process to execute in the cloud-computing environment to provide a level of service, wherein the actual number of workloads includes the desired number of workloads and one or more additional workloads; and
   deploying, based on determining the actual number of workloads, one or more workloads to one or more nodes of the cloud-computing environment to reach the actual number of workloads of the process executing in the cloud-computing environment, wherein the one or more additional workloads are standby instances of the process that are agnostic to a configuration including the different configurations of each workload in the desired number of workloads, and wherein the one or more additional workloads are configurable using one of the different configurations where a corresponding workload fails,
   wherein the process corresponds to a remote unit (RU) process in a mobile edge computing environment, and the desired number of workloads are each for a different configuration of the RU process, and the one or more additional workloads are standby instances of the RU process that are agnostic to the configuration.

2. The computer-implemented method of claim 1, wherein the one or more failure probabilities include a failure probability of the process.

3. The computer-implemented method of claim 1, wherein the one or more failure probabilities include a failure probability of the one or more nodes.

4. The computer-implemented method of claim 1, wherein determining the actual number of workloads is based on the one or more failure probabilities of failure within a timeslot.

5. The computer-implemented method of claim 1, wherein the desired number of workloads and the one or more additional workloads are of a same configuration of the process.

6. The computer-implemented method of claim 1, further comprising determining a location of the one or more nodes for deploying the one or more workloads, wherein determining the actual number of workloads is further based on the location of the one or more nodes.

7. The computer-implemented method of claim 6, wherein determining the actual number of workloads is further based on the location of the one or more nodes, as determined, in determining the one or more failure probabilities.

8. The computer-implemented method of claim 1, wherein determining the actual number of workloads is further based on a type of node for executing the process.

9. The computer-implemented method of claim 1, wherein determining the actual number of workloads is further based on an equipment cost or latency cost of the one or more nodes.

10. The computer-implemented method of claim 1, wherein determining the actual number of workloads includes using machine learning to determine the actual number of workloads based on a trained model of actual numbers of workloads to achieve desired numbers of workloads that achieved the level of service.

11. A computer-implemented method for handling failure for workloads in a cloud-computing environment, comprising:
   executing multiple workloads in a cloud-computing environment cluster, wherein each workload of the multiple workloads corresponds to a separate instance of a process that is executed according to a separate configuration;
   executing a standby workload as a second instance of the process without at least a portion of the separate configuration that varies among the multiple workloads; and
   based on detecting termination of one of the multiple workloads, configuring the standby workload to execute based on at least the portion of the separate configuration that corresponds to the separate instance of the process corresponding to the one of the multiple workloads,
   wherein the process corresponds to a remote unit (RU) process in a mobile edge computing environment, and the multiple workloads are each for a different configuration of the RU process, and the standby workload is the second instance of the RU process without at least the portion of the separate configuration.

12. The computer-implemented method of claim 11, further comprising, based on configuring the standby workload, executing a second standby workload as the second instance of the process without at least the portion of the separate configuration used by the multiple workloads.

13. The computer-implemented method of claim 12, wherein the standby workload is the one of the multiple workloads for which termination was detected.

14. The computer-implemented method of claim 11, wherein the process is a base station process and the separate configuration for each process relates to performing the process for a separate base station.

15. A device for deploying workloads on nodes in a cloud-computing environment, comprising:
   a memory storing one or more parameters or instructions for deploying workloads in the cloud-computing environment; and
   at least one processor coupled to the memory, wherein the at least one processor is configured to:
      determine, for a process to be provided in the cloud-computing environment, a desired number of workloads of the process to be executed in the cloud-computing environment, wherein each workload in the desired number of workloads is of a different configuration of the process;

determine, based on the desired number of workloads and based on one or more failure probabilities, an actual number of workloads of the process to execute in the cloud-computing environment to provide a level of service, wherein the actual number of workloads includes the desired number of workloads and one or more additional workloads; and deploy, based on determining the actual number of workloads, one or more workloads to one or more nodes of the cloud-computing environment to reach the actual number of workloads of the process executing in the cloud-computing environment, wherein the one or more additional workloads are standby instances of the process that are agnostic to a configuration including the different configurations of each workload in the desired number of workloads, and wherein the one or more additional workloads are configurable using one of the different configurations where a corresponding workload fails, wherein the process corresponds to a remote unit (RU) process in a mobile edge computing environment, and the desired number of workloads are each for a different configuration of the RU process, and the one or more additional workloads are standby instances of the RU process that are agnostic to the configuration.

16. The device of claim 15, wherein the one or more failure probabilities include a failure probability of the process.

17. The device of claim 15, wherein the one or more failure probabilities include a failure probability of the one or more nodes.

18. The device of claim 15, wherein the at least one processor is configured to determine the actual number of workloads based on the one or more failure probabilities of failure within a timeslot.

19. The device of claim 15, wherein the desired number of workloads and the one or more additional workloads are of a same configuration of the process.

* * * * *